No. 888,547. PATENTED MAY 26, 1908.
H. G. STEELE & J. J. WILLY.
GAS HEATING APPARATUS.
APPLICATION FILED APR. 22, 1907.
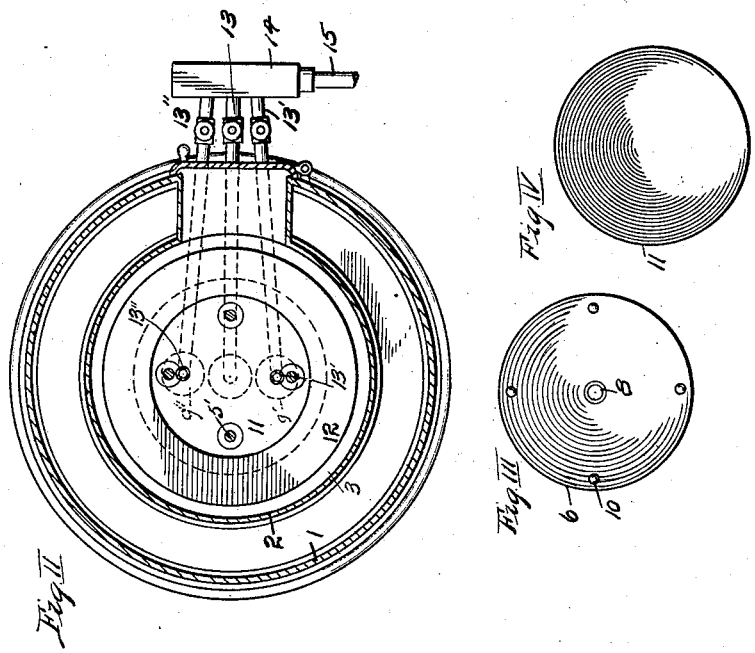
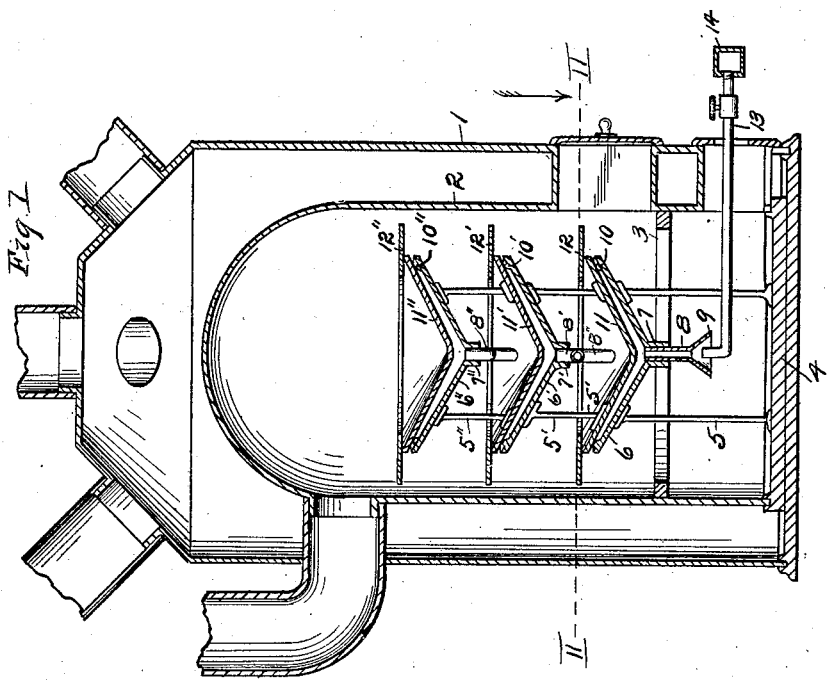
Witnesses:
R. E. Hamilton
A. M. Maxwell
Inventors,
Hiram G. Steele
and Joseph J. Willy
By Arthur E. Brown
Atty.

UNITED STATES PATENT OFFICE.

HIRAM G. STEELE AND JOSEPH J. WILLY, OF KANSAS CITY, MISSOURI.

GAS HEATING APPARATUS.

No. 888,547.

Specification of Letters Patent.

Patented May 26, 1908.

Application filed April 22, 1907. Serial No. 369,693.

*To all whom it may concern:*

Be it known that we, HIRAM G. STEELE and JOSEPH J. WILLY, citizens of the United States, residing at Kansas City, in the county of Jackson and State of Missouri, have invented certain new and useful Improvements in Gas Heating Apparatus; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our present invention relates to a gas heating apparatus, and more particularly to an apparatus of that class for use in hot air furnaces.

It is the object of our invention to provide a gas heating apparatus which is simple and economical in construction, and embodies the improved details of structure which will presently be fully described and pointed out in the claims, reference being had to the accompanying drawings forming part of the specification, in which like reference numerals refer to like parts throughout the several views, and in which,—

Figure I is a side view in central vertical section of an apparatus constructed according to our invention shown applied to an ordinary hot air furnace. Fig. II is a view in cross section on the line II—II, Fig. I. Fig. III is a plan view of one of the lower burner cones. Fig. IV is a similar view of one of the upper burner cones.

Referring more in detail to the drawings,— 1 represents the outer casing, and 2 the fire bowl of an ordinary hot air furnace.

3 represents the grate flange in the fire bowl, the grate having been removed to facilitate the installation of our apparatus.

Supported on the fire bowl base 4 are the standards 5, which support the lower cone 6 of the bottom burner of our apparatus, which of the bottom burner is provided at its apex with a neck member is provided at its apex with a neck 7, through which projects the short tube 8, having a depending mixing hood 9.

On the upper surface of cone 6, near its periphery are the lugs 10, which support an upper cone 11, which serves as a spreader for the gases discharged into the chamber between members 11 and 6, as will presently be more fully described.

On cone 11 are the standards 5', which support the lower cone 6' of a second burner, cone 6' having a neck 7' in which is carried a tube 8' which extends downwardly through the lower burner and is provided with a hood 9'. Cone 6' is provided with lugs 10' and 9'. Cone 6' is provided with lugs 10' and supports an upper cone 11', all of which parts are identical with the similar parts comprising and connected with the lower burner, previously described. The upper cone 11' of the second burner in turn supports the standards 5'' which carry a third burner comprising the lower cone member 6'' having a neck 7'', and a tube 8'' which extends downwardly through the two lower burners and is provided with the hood 9'' and which is also provided with the lugs 10'' supporting the spreading cone member 11''.

Supported on the upper members of each of the spreading cones are the baffle rings 12—12'—12'', which extend beyond the peripheries of the cones and aid in securing a perfect combustion of the gases and in the diffusion of the heat.

Opening into the respective hoods on the tubes, depending from the spreading cones are the feed pipes 13—13'—13'', which pipes are provided with separate cut-offs and terminate in a manifold 14, which is connected with a main supply pipe 15.

When in use, the gas is turned on by opening the cocks in the separate feed pipes, and rises through the depending hoods and tubes into the chambers between the upper and lower cones of the various burners, and passing upwardly and outwardly along the under surface of the upper spreading cones, escapes through the peripheral outlet between the cone members into contact with the baffle rings supported on the spreading cones. After the supply has been turned on, the gas from the lower burner is ignited, and the flame rising in the fire bowl ignites the gas flowing from the upper burners, heating the burner parts and the gas passing through the feed pipes so that the gas flowing to the upper burners is in a highly combustible condition when delivered thereto.

Another advantage of our construction is that the gases are burned in close proximity to the fire bowl so that the heat may be applied directly thereto for radiation into the hot air jacket connecting with the heating pipes.

Having thus described our invention, what we claim as new therein, and desire to secure by Letters Patent is:—

In a gas heating apparatus, the combination with a fire bowl, of a set of burners arranged one above the other within said fire bowl, each burner comprising a pair of inverted cone members spread apart to form a fuel chamber and a peripheral discharge opening, a feed pipe opening through the lower cone member of each burner and extending downwardly through the successive lower members, and a baffle ring supported on and projecting beyond the periphery of the lower cone member of each burner, substantially as and for the purpose set forth.

In testimony whereof we affix our signatures in presence of two witnesses.

HIRAM G. STEELE.
JOSEPH J. WILLY.

Witnesses:
J. T. ALLBRITAIN,
A. M. MAXWELL.